Jan. 16, 1968 K. MECKY ETAL 3,363,768
FILTER PRESS
Filed Aug. 7, 1964 2 Sheets-Sheet 2

INVENTORS
Karl MECKY
Erich FIEBIGER

United States Patent Office 3,363,768
Patented Jan. 16, 1968

3,363,768
FILTER PRESS
Karl Mecky, Bad Kreuznach, and Erich Fiebiger, Siefersheim, Rhineland, Germany, assignors to Seitz-Werke G.m.b.H., Bad Kreuznach, Rhineland, Germany
Filed Aug. 7, 1964, Ser. No. 388,155
Claims priority, application Germany, Aug. 8, 1963, S 86,627
8 Claims. (Cl. 210—224)

The present invention relates to a filter press with a filter packet composed of a plurality of filter plates and clamped between a fixed and a movable end plate of the filter press. Devices of the above-mentioned type suitable for the filtration of liquid by means of prefabricated filter layers or by means of deposited or settled auxiliary filter substances have the marginal portions of the plates of the filter packets provided with annular conduit sections which, with the filter packet in compressed condition, form continuous liquid conducting passages. At the cloudy side and also at the glossy side, the said composite conduits are connected to fixed conduits for the supply and discharge, respectively, of liquids. The said fixed conduits may be provided in the form of riser or connecting conduits within the range of the end plates of the filter press. It is known to arrange said conduits in form of tubular conduits on the outside of and along said press end plates.

Filter presses with end plates have become known according to which the above-mentioned conduits are in the form of continuous passages provided in the interior of the plate body. Such an arrangement, however, has the drawback that it is rather difficult to provide such conduits with a protective surface coating. Above all, however, it requires a considerable amount of labor and time to vent the filter packet, which fact is closely associated with the connection of the riser and connecting conduits with the composite liquid passages formed by the annular conduit sections of the filter plate. These passages are on the cloudy side customarily interconnected by an upper and lower branch of the riser. Consequently, with these known arrangements, the filter material will, when entering the filter packet, pass from the top to the bottom in the filter plates simultaneously and uniformly so that the entrapped air can escape only against the entering liquid. As a result thereof, frequently considerable quantities of air are entrapped and cannot escape. This entrapped air is particularly harmful inasmuch as before and during the filtration, the air bubbles through the filter layers onto the glossy side of the filter packet whereby the fiber structure of the layers can be varied considerably. In a similar manner, the entrapped air also affects the settling operation employed in connection with filtrations using auxiliary filter substance.

It is, therefore, an object of the present invention to provide an arrangement of the above-mentioned general type which will overcome the above-outlined drawbacks.

It is another object of this invention to provide an arrangement of the general type set forth above, which will greatly improve the conduction of liquids within the range of the press end plates.

It is also an object of this invention to provide a filter press with a filter packet interposed between the end plates of the press, which will permit a proper and quick venting of the filter packets.

These and other objects and advantages of the invention will appear more clearly from the following specification in connection with the accompanying drawings, in which:

FIGURE 1 diagrammatically and isometrically illustrates the end plates of a filter press with an open filter packet therebetween;

The arrangement according to the present invention is characterized primarily in that that plate of the filter packet which is directly adjacent the fixed end plate of the press is designed box-like or magazine-like, and is open toward one side for distributing the material to be filtered. The said box or magazine-like distributing chamber has its bottom provided with a bore adapted to be connected with a liquid supply conduit extending through the fixed end plate of the press. The said distributing chamber has its side walls extending perpendicular to said bottom and perpendicular to the adjacent plate of the filter packet while annular conduit sections are connected to said side walls. The lower side wall has provided adjacent one annular conduit section an opening which, through a corresponding passage communicates with the last-mentioned annular section, and similarly, the upper side wall of said distributing chamber is provided with a corresponding opening communicating with the adjacent annular conduit section (preferably diagonally opposite to said first-mentioned annular conduit section). The said distributing chamber is, in conformity with a further feature of the invention, so designed that the cross-sectional width of the liquid passages leading from the respective lower and upper side wall sections to the respective annular conduit sections have a total free diameter which corresponds to the liquid inlet in the bottom of the distributing chamber, said last-mentioned liquid inlet preferably being located in one-half of the distributing chamber in or near the chamber center which contains the passages leading to the annular conduit sections.

According to a further development of the invention, the distributing chamber may also be employed as effective filter plate. To this end, it is merely necessary to provide that open side of the distributing chamber which faces the adjacent plate of the filter packet, with a perforated cover. According to a preferred embodiment of the invention, the distributing chamber is equipped with a venting valve which, if desired, may be equipped with a sight glass. This valve may be arranged so that when the filter packet is compressed, it will be located on the upper side wall of the distributing chamber.

According to a still further feature of the invention, it is also possible to replace the filter packet plate which is adjacent to the movable end plate by a plate which corresponds to the distributing chamber but forms the image thereto. However, in this instance, the inlet opening will have to be plugged.

Figure 1:
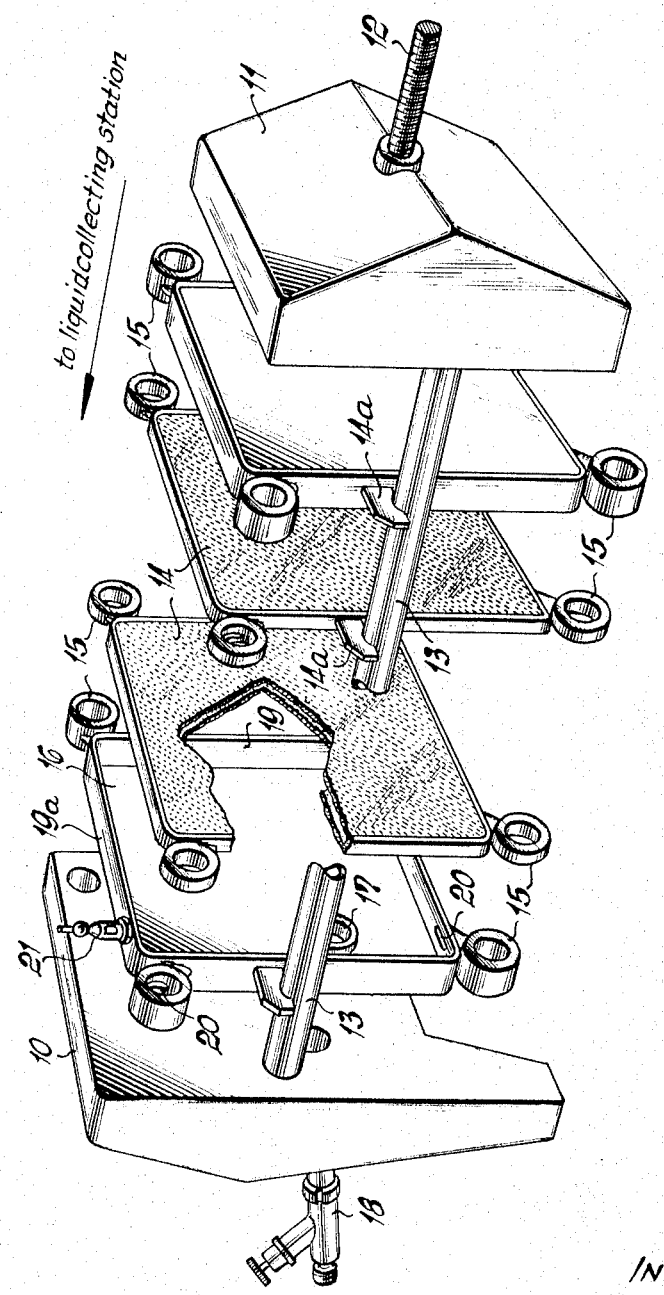

Referring now to the drawing in detail, the arrangement shown in FIG. 1 illustrates the front fixed end plate 10 and the oppositely located movable rear end plate 11 of a filter press not further shown in the drawing. Operatively connected to the movable end plate 11 is a central threaded spindle 12 which, by actuation thereof displaces the end plate 11 toward or away from the fixed end plate 10.

Interposed between the two end plates 10 and 11 is a filter packet composed of a plurality of filter plates 14 which by means of arms 14a displaceably rest on parallel guiding rods 13 of which one is being shown in the drawing. Each of said filter plates 14 is advantageously provided with four annular conduit sections 15 which are connected to the marginal portion of the respective filter plate outside the filtering area. Preferably, pre-fabricated filter layers are interposed between the adjacent plates 14 for the filtration of liquids.

That plate 16 which is adjacent the fixed end plate 10 of the filter press is box-shaped or has the shape of a pan and serves as distributing chamber for the filter substance. The box is open toward one side and has an opening 17 in its bottom. This opening 17 is adapted to communicate with a supply line 18 leading through the end of fixed end plate 10. Box 16 is provided with a marginal strip 19 which is substantially perpendicular to the bottom of the box while having its edges on one side facing fixed end plate 10 and having its edges on the other side facing the adjacent filter plate 14. The said marginal strip 19 has connected thereto annular passage sections 15. Plate or box 16 has connecting passages 20 extending through the marginal strip 19 and respectively leading to an upper and a lower annular conduit section 15.

The inlet opening 17 in the bottom of box 16 has a free inner width which corresponds to the total cross-sectional width of the two connecting passages 20. Advantageously, opening 17 is arranged in a chamber section in or near the chamber center which comprises the passage 20 leading to the annular sections 15. Chamber 16 is additionally equipped with a venting valve 21 which is mounted on the upper marginal strip section 19a of strip 19.

Figure 2:
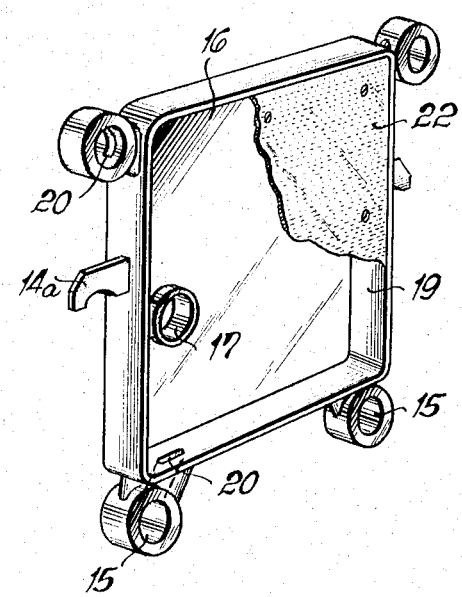
FIGURE 2 shows a chamber of the filter press for distributing the material to be filtered.

In order to employ the distributing chamber 16 as filter plate, the open side of the chamber 16 may be provided with a detachable perforated cover 22 (FIG. 2). When the filter press is closed, chamber 16 with cover 22 and a filter layer inserted ahead of the adjacent plate 14 increases the filter packet by a further effective filter element.

Figure 3:
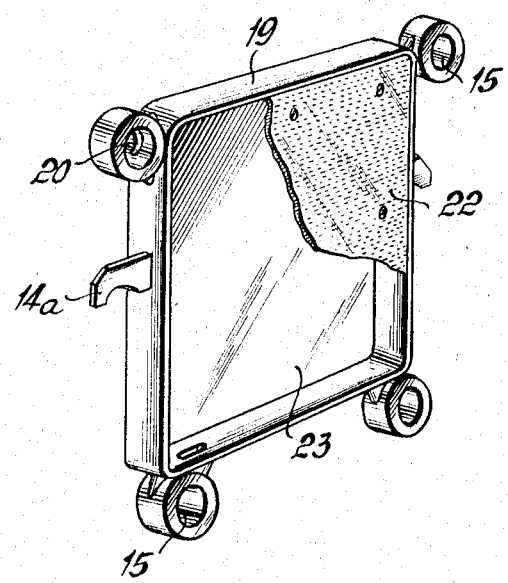
FIGURE 3 represents a further chamber of the filter press for the filtrate.

That plate 23 which is adjacent the movable press plate 11 likewise forms a chamber which forms an image to the distributing chamber 16 and serves as filtrate chamber (FIG. 3). As will be evident from the drawing, chamber 23 is likewise equipped with a perforated cover 22 but in contrast to plate 16 lacks an opening corresponding to opening 17 of plate 16. However, if it is preferred to have plate 23 and plate 16 of the same design, opening 17 may be plugged in a liquid-tight manner relative to movable plate 11, if plate 23 is to serve as a filtrate chamber in the manner of plate 23 shown in FIG. 1.

When the filter press is closed, the annular conduit sections 15 of the filter plates 14 and chambers 16 and 23 pressed together form composite conduits on the cloudy and glossy side. On the cloudy side, these conduits communicate with distributing chamber 16. When supplying liquid through opening 17, said liquid passes through the lower passage 20 into the lower composite conduit composed of lower annular conduit sections 15. Consequently, the liquid level rises from the bottom strip section in chamber 16 and displaces the air upwardly which escapes through the opened valve 21. Only after the chamber 16 has been filled will the liquid pass through the filter plates 14 into the upper composite section composed of upper sections 15 and pertaining to the cloudy side, so that the filter packet for the subsequently starting filtration will be free from air.

It is, of course, to be understood, that the present invention is, by no means, limited to the particular arrangement shown in the drawings, but also comprises any modifications within the scope of the appended claims.

What we claim is:

1. In combination with a filter press having a fixed end plate with fluid inlet conduit means and fluid outlet conduit means, and a movable end plate arranged in spaced relationship to said fixed end plate and facing the latter: a filter packet adapted to be clamped between said fixed and movable end plates and including plates having the outer marginal area thereof provided with tubular sections adapted in clamped condition of said plates to form composite conduit means, that plate of said filter packet which is nearest said fixed end plate forming a distributor plate having a bottom facing said end plates and having side wall means surrounding said bottom and defining therewith a box-shaped distributing chamber open toward the adjacent one of the other plates of said filter packet, a pair of tubular sections connected to the outside of said side wall means for respective connection with the tubular sections of the other plates of said filter packet, said pair of tubular sections respectively forming a portion of a line for conveying unfiltered liquid and a portion of a line for conveying filtered liquid to said fluid outlet conduit means, said bottom having an inlet passage for connection with said inlet conduit means of said fixed plate, and additional conduit means extending from the interior of said box-shaped distributing chamber through said side wall means thereof to that tubular section thereon which forms a portion of the unfiltered liquid conveying line.

2. An arrangement according to claim 1, in which the bottom of said distributing chamber is substantially parallel to the adjacent end face of said fixed end plate, and in which said side wall means is substantially perpendicular to said bottom.

3. An arrangement according to claim 1, which includes: a venting valve arranged on an upper section of the side wall means of said distributing chamber.

4. An arrangement according to claim 1, in which that plate of said filter packet which is adjacent said movable end plate corresponds to and forms an image to said distributing chamber while said passage in the bottom of the plate adjacent said movable end plate is closed.

5. In combination with a filter press having a fixed end plate with fluid inlet means and with fluid outlet means for respectively admitting unfiltered and discharging filtered liquid, and a movable end plate arranged in spaced relationship to said fixed end plate and facing the latter: a filter packet adapted to be clamped between said fixed and movable end plates and including plates having the outer marginal area thereof provided with tubular sections adapted in clamped condition of said plates to form composite conduit means separated from each other for respective connection with said fluid inlet means and said fluid outlet means to convey unfiltered and filtered liquid respectively, that plate of said filter packet which is nearest said fixed end plate having a bottom facing said last mentioned end plate and having side wall means surrounding said bottom and confining therewith a box-shaped distributing chamber open in the direction toward the adjacent one of the other plates of said filter packet, the plate nearest said fixed end plate having its tubular sections connected to said side wall means for connection with the tubular sections forming said unfiltered and filtered fluid conveying conduit means, said bottom having an inlet passage for connection with said inlet means of said fixed plate, and additional conduit means extending from the interior of said box-shaped distributing chamber through said side wall means thereof to an adjacent tubular section thereon forming one of said unfiltered liquid conveying tubular sections, the total cross-section of the interior of said tubular sections on said distributing chamber corresponding to the free cross-section of the interior of said inlet passage in the bottom of said distributing chamber.

6. An arrangement according to claim 5, in which said fluid inlet means is located one side of the vertical plane of symmetry of said distributing chamber forming plate and in that half thereof which contains said additional conduit means, said inlet means being located at least near the horizontal plane of symmetry of said distributing chamber forming plate.

7. In combination with a filter press having a fixed end plate with fluid inlet conduit means and fluid outlet conduit means, and a movable end plate arranged in spaced relationship to said fixed end plate and facing the latter: a filter packet adapted to be clamped between said fixed and movable end plates and including plates having the outer marginal area thereof provided with tubular sections adapted in clamped condition of said plates to form composite conduit means for respectively conveying unfiltered liquid and filtered liquid, that plate of said filter packet which is nearest said fixed end plate having a bottom facing said last mentioned end plate and having side wall means surrounding said bottom and defining therewith a box-shaped distributing chamber open in the direction toward the adjacent plate of the other filter packet plates, the fluid outlet conduit means of said fixed end plate being connected to one of the tubular sections of said distributing chamber forming plate, perforated cover means detachably connected to said distributing chamber at the open side thereof to allow said distributing chamber to act as a filter plate, a pair of tubular sections connected to the outside of said side wall means for respective connection with the unfiltered and filtered liquid conveying tubular sections of the other plates of said filter packet, said bottom having an inlet passage for connection with said inlet conduit means of said fixed plate, and passage means leading from the interior of said box-shaped distributing chamber through said side wall means to said unfiltered liquid conveying tubular section of said distributing chamber.

8. In combination with a filter press having a fixed end plate with fluid inlet means and a movable end plate arranged in spaced relationship to said fixed end plate and facing the latter; a filter packet adapted to be clamped between said fixed and movable end plates and including plates having the outer marginal area thereof provided with tubular sections adapted in clamped condition of said plates to form composite conduit means, that plate of said filter packet which is nearest said fixed end plate having a bottom facing said last mentioned end plate and having side wall means surrounding said bottom and confining therewith a box-shaped distributing chamber open in the direction toward the adjacent one of the other plates of said filter packet, tubular sections connected to said side wall means for connection with the tubular sections of the other plates of said filter packet, said bottom having inlet passage means for connection with said inlet conduit means of said fixed plate, and additional conduit means extending from the interior of said box-shaped distributing chamber through said side wall means thereof to an adjacent tubular section thereon, the total cross section of the interior of said tubular sections on said distributing chamber corresponding to the free cross section of the interior of said inlet passage means in the bottom of said distributing chamber, said inlet passage means being closer to the lower portion of said distributing chamber than to the upper portion thereof, one of said tubular sections of said distributing chamber and said additional conduit means leading from the interior of said distributing chamber to said last mentioned tubular section being arranged near a lower section of said side wall means while another tubular section of said distributing chamber is arranged outside and near the top portion of said distributing chamber, the spacing between said last mentioned tubular section from said inlet passage means being greater than the distance between said inlet passage means and the tubular section near the bottom portion of said distributing chamber.

References Cited

UNITED STATES PATENTS

| 421,503 | 2/1890 | Licht | 210—226 X |
| 656,212 | 8/1900 | Posch | 210—226 |
| 1,242,784 | 10/1917 | Dyer et al. | 210—227 X |
| 2,281,454 | 4/1942 | Polivka | 210—227 |
| 2,453,613 | 11/1948 | Babbitt | 210—228 |

FOREIGN PATENTS 844,208   8/1960   Great Britain.

SAMIH N. ZAHARNA, *Primary Examiner.*

REUBEN FRIEDMAN, *Examiner.*

C. DITLOW, *Assistant Examiner.*